United States Patent
Avrutsky

(10) Patent No.: US 8,355,604 B2
(45) Date of Patent: Jan. 15, 2013

(54) INTEGRATED OPTICAL POLARIZER FOR SILICON-ON-INSULATOR WAVEGUIDES

(75) Inventor: Ivan Avrutsky, Troy, MI (US)

(73) Assignee: Wayne State University, Detroit, MI (US)

( * ) Notice: Subject to any disclaimer, the term of this patent is extended or adjusted under 35 U.S.C. 154(b) by 412 days.

(21) Appl. No.: 12/590,230

(22) Filed: Nov. 3, 2009

(65) Prior Publication Data

US 2011/0170822 A1 Jul. 14, 2011

Related U.S. Application Data

(60) Provisional application No. 61/198,243, filed on Nov. 3, 2008.

(51) Int. Cl.
*G02B 6/00* (2006.01)

(52) U.S. Cl. .................. 385/11; 427/162; 385/4; 385/6; 385/39

(58) Field of Classification Search .................... 385/11, 385/4, 6, 39; 427/162
See application file for complete search history.

(56) References Cited

U.S. PATENT DOCUMENTS

| 4,997,246 | A  | * | 3/1991 | May et al. .......................... 385/2 |
| 6,580,863 | B2 | * | 6/2003 | Yegnanarayanan et al. .. 385/132 |
| 6,590,694 | B2 | * | 7/2003 | Matsushita et al. ........... 359/280 |
| 7,764,850 | B2 | * | 7/2010 | Bratkovski et al. ............... 385/2 |
| 7,916,982 | B1 | * | 3/2011 | Bahuguna et al. ................ 385/1 |
| 2006/0215949 | A1 | * | 9/2006 | Lipson et al. ..................... 385/2 |
| 2008/0105940 | A1 | * | 5/2008 | Piede et al. .................. 257/432 |

* cited by examiner

*Primary Examiner* — Ellen Kim
(74) *Attorney, Agent, or Firm* — Rohm & Monsanto, PLC

(57) ABSTRACT

A silicon-on-insulator device has a waveguide having a carrier wafer layer, a buffer layer, a guiding layer, and a cladding layer. The silicon-on-insulator is additionally provided with a polarizing arrangement deposited on a predetermined portion of the waveguide, the polarizing arrangement being provided with a bottom metal layer, a dielectric gap, and a top metal layer, the bottom metal layer being deposited on the cladding layer. A protection layer formed of $SiO_2$ overlies the top metal layer. The polarizing arrangement attenuates preferentially the electromagnetic energy that is propagated in the waveguide in the TM transmission mode. There is formed a gap plasmon-polariton (GPP) confined to the dielectric gap, the dielectric gap having a high optical loss characteristic. In accordance with a method aspect, there are provided the steps of forming a silicon-on-insulator waveguide arrangement and depositing a polarizer structure that absorbs the electromagnetic energy in the TM transmission mode.

16 Claims, 6 Drawing Sheets

Fig. 2

Refractive Indices Formulas

| Material | Formula and wavelength range | Optical constants at $\lambda = 1500$ nm |
|---|---|---|
| Silicon | Sellmeier-like: $n(\lambda) = \sqrt{\varepsilon + \frac{\lambda_1^2}{\lambda^2} + \frac{A\lambda_2^2}{\lambda^2 - \lambda_2^2}}$<br><br>1.2 $\mu m < \lambda < 14$ $\mu m$<br>$\varepsilon = 11.6858$, $\lambda_1 = 969.441$ nm<br>$A = 8.10461 \cdot 10^{-3}$, $\lambda_2 = 1107.1$ nm | $n = 3.4804$<br>$dn/d\lambda = -8.41 \cdot 10^{-5}$ $nm^{-1}$ |
| Silica | Sellmeier: $n(\lambda) = \sqrt{1 + \sum_i \frac{A_i \lambda^2}{\lambda^2 - \lambda_i^2}}$<br><br>0.21 $\mu m < \lambda < 3.71$ $\mu m$<br>$A_1 = 0.6961663$, $\lambda_1 = 68.4043$ nm<br>$A_2 = 0.4079426$, $\lambda_2 = 116.2414$ nm<br>$A_3 = 0.8974794$, $\lambda_3 = 9896.161$ nm | $n = 1.4446$<br>$dn/d\lambda = -1.18 \cdot 10^{-5}$ $nm^{-1}$ |
| Gold | Drude: $\varepsilon(\omega) = 1 - \frac{\omega_p^2}{\omega(\omega + \omega_\tau)}$<br><br>0.7 $\mu m < \lambda < 32$ $\mu m$<br>$\omega_p = 2\pi \cdot 2.175 \cdot 10^{15}$ $s^{-1}$, $\omega_\tau = 2\pi \cdot 6.48 \cdot 10^{12}$ $s^{-1}$ | $Re(\varepsilon) = -117.3$<br>$Im(\varepsilon) = 3.836$<br>$dRe(\varepsilon)/d\lambda = -0.158$ $nm^{-1}$<br>$dIm(\varepsilon)/d\lambda = 7.67 \cdot 10^{-3}$ $nm^{-1}$ |

INTEGRATED OPTICAL POLARIZER FOR SILICON-ON-INSULATOR WAVEGUIDES

RELATIONSHIP TO OTHER APPLICATIONS

This application is related to, and claims the benefit of the filing dates of, Provisional Patent Application Ser. No. 61/198,243, filed on Nov. 3, 2008. The disclosures of this provisional patent application is incorporated herein by reference

BACKGROUND OF THE INVENTION

1. Field of the Invention

This invention relates generally to an integrated optical polarizer for high index contrast SOI waveguides, and more particularly to an integrated optical polarizer that operates through coupling of TM-polarized guided mode to a gap plasmon-polariton mode.

2. Description of the Related Art

Silicon-On-Insulator (SOI) platform is expected to become a common basis for integrated optical systems used in fiber optic communication industry. Its main advantage is compatibility with well-established complimentary metal-oxide-semiconductor (CMOS) fabrication technologies which have been proven to facilitate high volume manufacturing of highly integrated electronic devices and systems. SOI waveguides possess unusually high refractive index contrast (n(Si)≈3.48, n(SiO$_2$)≈1.44). This provides a very strong confinement for guided modes and eventually leads to a very high degree of integration, which is hardly achievable using traditional integrated optical material systems. SOI-based integrated optics quickly evolved into a separate field—silicon photonics. At the telecom wavelengths, many silicon photonic devices have been successfully demonstrated including optical multiplexers/demultiplexers based on arrayed waveguide gratings, silicon chip Raman lasers, photonic circuits based on photonic crystals, electro-optical modulators, narrowband filters, and others.

Polarization control is an essential component of integrated optical systems. Several schemes have been proposed for integrated optical polarizers implemented in SOI. The lateral Bragg reflector structure made of Si/Si$_3$N$_4$ has been shown to be polarization-sensitive, especially when light approaches Si/Si$_3$N$_4$ interfaces at the Brewster angle. In such a structure, also known as antiresonant reflecting optical waveguide, light is confined to a low-index core. The lateral confinement requires several Bragg periods and thus can never be really strong. The vertical antiresonant reflecting optical waveguide structure is also polarization-sensitive, and it also provides weak light confinement to a low-index core. The scheme employing 3-dB multi-mode interference couplers and Mach-Zehnder interferometer with rib waveguides of different width relies on birefringence in the rib waveguides. It works in a spectral range of about 45 nm. The Mach-Zehnder interferometer with multi-mode interference couplers altogether has a relatively large footprint. The scheme that uses vertically coupled microring resonator is expected to provide 20 dB polarization splitting ratio, however, in a very narrow range of wavelengths.

The above schemes are a lot more complicated compared to a simple and elegant integrated optical polarizer in which transverse magnetic (TM) polarized light is coupled to a surface plasmon-polariton mode, which then quickly decays due to losses in the metal. Transverse electric (TE) mode in a system made of isotropic materials cannot be coupled to the plasmon-polariton and thus propagates with much smaller losses. These polarizers are known since 1970s. It worth mentioning that some polarization discrimination is known to exist in waveguides with metallic claddings even if there is no coupling to plasmon-polaritons: due to different penetration of light into the metallic cladding, losses for TE-polarized mode are lower compared to losses for TM-polarized mode. Thus, the simplest structure of an integrated optical polarizer would contain just a metallic cladding over dielectric guiding layer. By introducing appropriately designed dielectric cladding layer between the guiding layer and the metal, efficient interaction is facilitated between the mode confined to the guiding layer and the plasmon-polariton at the metal/cladding layer interface, leading to dramatic improvement of the polarizer performance.

Unfortunately, such approach cannot directly be applied to the SOI waveguides because it is difficult to match the propagation constants of a guided mode in an SOI waveguide and a surface plasmon-polariton mode. The problem is that the modal index of the guided mode is large (comparable to the refractive index of silicon), while modal index of the plasmon-polariton is low, being just slightly above the refractive index of the dielectric cladding layer between the silicon guiding core and the metal layer. On the other hand, metal-dielectric nanoscale multilayers have been shown to support high-index plasmonic modes. In a structure made of three pairs of silica(~29 nm)/gold(~25 nm) nano-layers, guided modes with indices 2.31 and 2.88 have been experimentally verified. The simplest high-index plasmonic mode is a gap plasmon-polariton supported by a thin dielectric gap layer between metallic layers.

It is, therefore, an object of this invention to provide a polarization arrangement that requires but a small footprint.

It is another object of this invention to provide a simple integrated polarization arrangement.

It is also an object of this invention to provide a polarizer arrangement that can be operated over a relatively broad ranged of frequencies It is a further object of this invention to provide a polarizer arrangement that the overall design can be completed by simple adjustment of the thicknesses of the layers.

SUMMARY OF THE INVENTION

The foregoing and other objects are achieved by this invention which provides a silicon-on-insulator device having a waveguide having a carrier wafer layer, a buffer layer, a guiding layer, and a cladding layer. The silicon-on-insulator is additionally provided with a polarizing arrangement deposited on a predetermined portion of the waveguide.

In one embodiment of the invention, the polarizing arrangement is provided with a bottom metal layer, a dielectric gap, and a top metal layer, the bottom metal layer being deposited on the cladding layer. In some embodiments, a protection layer deposited to overlie the top metal layer. The protection layer is formed of SiO$_2$. The waveguide is, in some embodiments, a silicon-on-insulator waveguide that propagates electromagnetic energy in TE and TM transmission modes. Moreover, the polarizing arrangement is configured in this embodiment to attenuate preferentially the electromagnetic energy that is propagated in the waveguide in the TM transmission mode. In accordance with the invention, there is formed a gap plasmon-polariton (GPP) confined to the dielectric gap. The dielectric gap therefore has a high optical loss characteristic.

In a further embodiment of the invention, the guiding layer and the dielectric gap are spaced from one another so as to allow electromagnetic energy propagating along the guiding layer in the TM transmission mode to transfer to the dielectric gap. The transfer of electromagnetic energy from the guiding layer to the dielectric gap is effected by tunneling coupling.

In a specific illustrative embodiment of the invention, the dielectric gap is formed of $SiO_2$ and the top and bottom metal layers are formed of Au. In a highly advantageous embodiment, the polarizing arrangement has a magnetic field strength characteristic that tapers discontinuously at the interface between the dielectric gap and the top and bottom metal layers.

In accordance with a method aspect of the invention, there is provided a method having the steps of:

forming a silicon-on-insulator waveguide arrangement for propagating electromagnetic energy in a plurality of transmission modes; and depositing on the silicon-on-insulator waveguide arrangement a polarizer structure that preferentially absorbs the electromagnetic energy being propagated along the silicon-on-insulator waveguide arrangement in a predetermined transmission mode.

In one embodiment of the method aspect of the invention, the step of depositing includes the steps of:

depositing a bottom metal layer;

depositing a dielectric gap layer to overlie the bottom layer; and depositing a top metal layer to overlie the dielectric gap layer.

There is provided in some embodiments the further step of depositing a protection layer to overlie the top metal layer.

In a still further embodiment of the method aspect of the invention, the plurality of transmission modes include TE and TM transmission modes. The polarizer structure preferentially absorbs the electromagnetic energy being propagated along the silicon-on-insulator waveguide arrangement in the TM transmission mode.

In the process of forming an embodiment of the invention, the step of depositing includes the further step of employing chemical vapor deposition. In a further process of forming an embodiment of the invention, the step of depositing includes the further step of employing thermal evaporation.

The integrated optical polarizer of the present invention employs resonant coupling of TM-polarized mode in SOI waveguide to a high-index mode supported by a nanoscale metal-dielectric multilayer, such as gap plasmon-polariton. Analytical estimation shows that with sufficiently small thickness of the dielectric gap layer between the metal claddings, resonance between the guided mode carried by the SOI structure and the gap plasmon-polariton mode is always achieved. The supermodes in a specific illustrative embodiment of the invention are analyzed using a transfer matrix method. The attenuation for the TM-polarized mode initially coupled to the SOT waveguide is estimated using the coupled mode theory.

In accordance with the invention, there is provided an integrated optical polarizer for high index contrast SOI waveguides, which operates through coupling of TM-polarized guided mode to a gap plasmon-polariton mode. Numerical illustration is provided for a planar waveguide while there are all expectations to believe that the proposed approach will work equally well for rib waveguides. The proposed structure consists of several nano-scale metal-dielectric layers on top of a SOI waveguide. In a specific illustrative embodiment of the invention, a 80 µm long section of such a loaded waveguide provides more than 25 dB attenuation to TM-polarized mode in the wavelength range as wide as 225 nm (from about 1400 nm to 1625 nm), while insertion loss for the transverse electric (TE) mode is from 3 dB-4 dB. No other integrated optical polarizer for SOI waveguides is known to operate in such a wide spectral range, and no other polarizer would have such a small footprint.

The basic structure of the proposed integrated optical polarizer comprises an SOI waveguide and a metal-dielectric nanoscale multilayer supporting high-index plasmonic modes. In a simple embodiment of the invention this can be a gap plasmon-polariton (GPP) confined to a dielectric gap layer between metal layers. More sophisticated embodiments of the invention employ so-called "bulk plasmon-polaritons" (BPP) supported by structures with multiple gap layers separated by thin metal layers. The dielectric gap layer thickness is adjusted to provide phase synchronism between the GPP mode (or one of the BPP modes) and TM-polarized guided mode of the SOI structure. Strong coupling is achieved by using a thin cladding layer separating the silicon guiding core from the metal-dielectric multilayer.

Even though the functioning of this embodiment of the invention relies on resonant coupling, the strong coupling together with rather high optical losses for GPP allows for the device operation in a wide spectral range. These factors also contribute to shrinking the footprint of the polarizer.

BRIEF DESCRIPTION OF THE DRAWING

Comprehension of the invention is facilitated by reading the following detailed description, in conjunction with the annexed drawing, in which:

FIG. 2 is a table that summarizes the optical properties of silicon, silica, and gold in the wavelength range of interest;

DETAILED DESCRIPTION

Figure 1:
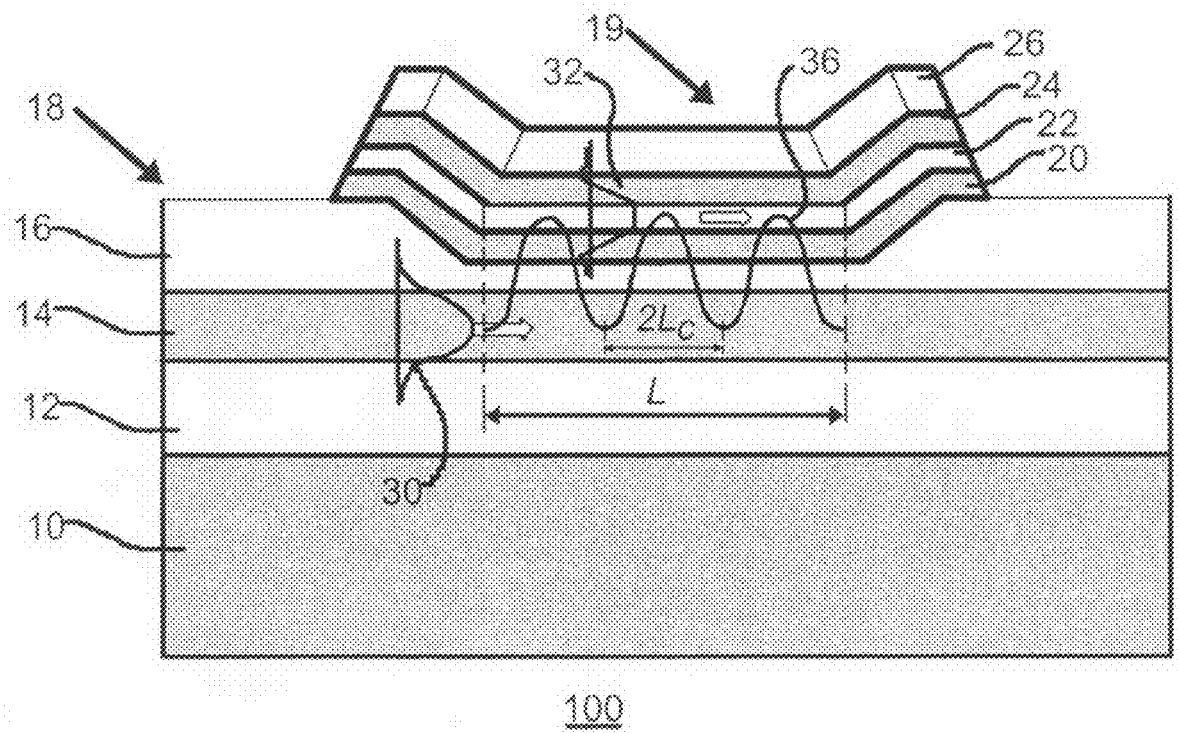
FIG. 1 is a simplified schematic cross-sectional representation of a specific illustrative embodiment of the invention that is useful to demonstrate the operation of the invention.

FIG. 1 is a simplified schematic cross-sectional representation of a specific illustrative embodiment of the invention that is useful to demonstrate the operation of the invention. More specifically, the SOI waveguide embodiment 100 represented in the simplified representation of FIG. 1 is provided with a silicon carrier wafer 10 formed of Si, a silica buffer layer 12 (subscript b in further formulas), and silicon guiding layer 14 (subscript g). Silica buffer layer 12 is typically thick enough so that the modal field of guided light waves does not reach carrier wafer 10.

A thin cladding layer 16 (subscript c) is placed on top of silicon guiding layer 14 to separate an SOI waveguide 18 from polarizer structure 19 that supports the gap plasmon-polariton (not shown), which is essentially a pair of metal layers, specifically a bottom metal layer 20 (designated m1), and top metal layer 24 (designated m2) with a dielectric gap layer 22 (designated d) interposed between them. The gap plasmon-polariton is contained within dielectric gap layer 22. The entire structure is, in this embodiment, covered by a protection layer 26 (designated p) that protects top metal layer 24 from mechanical damage.

In the embodiment of the invention represented in FIG. 1, the illustrative materials employed therein are as follows:

carrier wafer 10 is formed of Si;
silica buffer layer 12 is formed of $SiO_2$;
silicon guiding layer 14 is formed of Si;
cladding layer 16 is formed of $SiO_2$;
bottom metal layer 20 is formed of Au;
dielectric gap layer 22 is formed of $SiO_2$;
top metal layer 24 is formed of Au; and
protection layer 26 is formed of $SiO_2$;

One of the attractive features of the polarizer structure disclosed herein is that the overall design can be completed by adjusting only the thicknesses of the layers while their refractive indices would be fixed being defined by the choice of CMOS-compatible materials. The guiding layer is, in this embodiment, made of silicon, and the buffer, cladding, gap, and protection layers are, in some embodiments, all may be made of silica. An advantageous material choice for the metal layers is gold.

From the standpoint of operating characteristic, silicon guiding layer 14 has, in this specific illustrative embodiment of the invention, an intensity distribution characteristic in the guided mode across the waveguide that is represented in FIG. 1 by an intensity distribution characteristic curve 30. As shown, intensity distribution characteristic curve 30 has a curved peak that coincides with the central region of silicon guiding layer 14, and which tapers to substantially zero in silica buffer layer 12 and cladding layer 16. Thus, the bulk of the electromagnetic energy is propagated along silicon guiding layer 14.

The operating characteristic of dielectric gap layer 22 is different from that of silicon guiding layer 14, and is represented in FIG. 1 by a magnetic field strength characteristic curve 32. As shown in this figure, magnetic field strength characteristic curve 32 is substantially constant across dielectric gap layer 22, and tapers discontinuously in bottom metal layer 20 and top metal layer 24.

A sinusoid 36 illustrates that electromagnetic energy that is propagated along silicon guiding layer 14, particularly electromagnetic energy in the TM transmission mode, extends into dielectric gap layer 22 where it is subjected to high levels of optical losses. Thus, the energy, in this specific illustrative embodiment of the invention, that is propagated in the TM transmission mode is diminished preferentially, leaving in silicon guiding layer 14 a relatively higher proportion of electromagnetic energy propagated in the TE transmission mode. The transfer of electromagnetic energy from silicon guiding layer 14 to dielectric gap layer 22 is achieved, in this embodiment of the invention, by tunneling.

FIG. 2 is a table that summarizes the optical properties of silicon, silica, and gold in the wavelength range of interest. The approximate values of layer thicknesses can readily be determined by comparing the modal indices of a TM-polarized mode in the SOI waveguide, $n_{TM}$, and the GPP mode confined to the dielectric layer sandwiched between metal layers, $n_{GPP}$. The modal index in a symmetric ($n_b=n_c$) slab waveguide is found by solving numerically the dispersion equation:

$$\tan\left(\frac{\pi t_g}{\lambda}\sqrt{n_g^2 - n_{TM}^2}\right) = \frac{n_g^2}{n_c^2}\sqrt{\frac{n_{TM}^2 - n_c^2}{n_g^2 - n_{TM}^2}} \quad \text{EQUATION (1)}$$

where $\lambda$ is the vacuum wavelength of light, $t_g$ is the thickness of the guiding layer, $n_g$ and $n_c$ are refractive indices of the guide and cladding respectively.

The modal index of GPP is defined by the dispersion equation:

$$\tanh\left(\frac{\pi t_d}{\lambda}\sqrt{n_{GPP}^2 - n_d^2}\right) = -\frac{n_d^2}{s_m}\sqrt{\frac{n_{GPP}^2 - \varepsilon_m}{n_{GPP}^2 - n_d^2}} \quad \text{EQUATION (2)}$$

in which $t_d$ is the is the thickness of the dielectric gap layer, $n_d$ is the refractive index of the gap layer, and $e_m$ is the dielectric permittivity of metal layers (both top and bottom metal layers).

In the case of a very thin gap layer, the last equation can be approximately solved as follows:

$$n_{GPP} \approx \sqrt{n_d^2 + \frac{1}{2}\left(\frac{\lambda}{\pi t_d}\frac{n_d^2}{s_m}\right)^2 + \sqrt{\left(\frac{\lambda}{\pi t_d}\frac{n_d^2}{\varepsilon_m}\right)^2(n_d^2 - \varepsilon_m) + \frac{1}{4}\left(\frac{\lambda}{\pi t_d}\frac{n_d^2}{\varepsilon_m}\right)^4}} \quad \text{EQUATION (3)}$$

From Equation (3), in approximation $t_d \to 0$, $n_{GPP}$ is scaled inversely proportionally to the gap layer thickness. Due to this, even using low-index material such as silica, one can always find suitable thickness of the dielectric gap layer to match high value of the modal index of the SOI waveguide determined from Equation (1).

The thickness of the bottom metal layer $t_{m1}$ should be small enough to let the guided mode in the gap layer tunnel to the cladding layer and thus to the SOI waveguide. The gold film would be semi-transparent at a thickness in the range of few dozens of nanometers. The thickness of the top metal layer $t_{m2}$ as well as thickness of the protection layer $t_p$ are not critical.

The thickness of the cladding layer $t_c$ affects the coupling strength between the mode in SOI waveguide and the gap plasmon-polariton.

The simple consideration outlined above should be considered as a qualitative justification that a proper thickness of the dielectric gap layer can always be found so that the modal index of the gap plasmon-polariton will match the index of the SOI waveguide. It can also be used for choosing reasonable initial values of layer thicknesses, which further should be optimized by a more careful numerical modeling of guided modes in the entire structure. One should note though, that in an optimized structure the metal layers as well as the cladding layer between the silicon guiding core and the bottom metal layer are nano-scale thin rather than infinitely thick. For this reason the optimal thicknesses of the layers may differ from the values predicted by Equations (1) and (2).

The following is an illustrative design of an integrated optical polarizer operating in the wavelength range from about 1400 nm to 1625 nm. Thickness of the silicone guide layer is chosen to be $t_g$=220 nm so that the SOI waveguide support single mode in the wavelength range of interest. Thicknesses of both metal layers as well as thickness of the cladding layer were set at $t_{m2}=t_{m1}=t_c=30$ nm. Increasing these thicknesses results in narrowing the working range of the polarizer, while decreasing eventually leads to undesirably high losses for TE-polarized mode. The thickness of the protection layer was set to be $t_p=100$ nm. This parameter is not crucial and does not require optimization. The thickness of the dielectric gap layer $t_d$ is then adjusted so that the dispersion curves representing the modal indices for TM-polarized modes in the entire structure show clear anti-crossing in the middle of the wavelength range of interest, that is, close to 1500 nm. The adjusted value of the dielectric gap layer thickness is $t_d=26$ nm in this specific illustrative embodiment of the invention.

Figure 3:
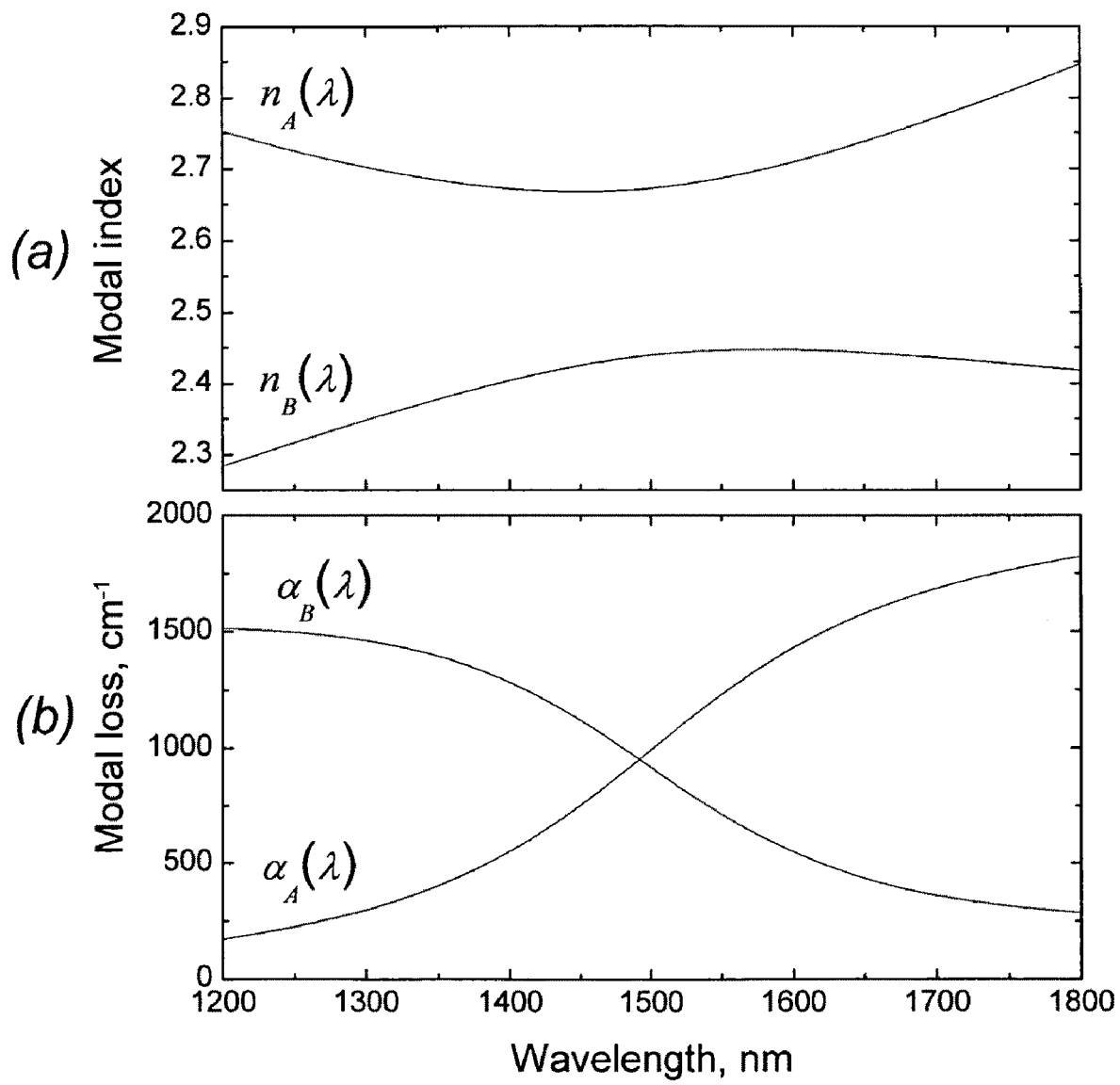
FIGS. 3(*a*) and 3(*b*) are graphical representations of the modal index and losses for TM polarized supermodes of an entire structure of an embodiment of the invention.

FIGS. 3(a) and 3(b) are graphical representations of the modal index and losses for TM polarized supermodes of an entire structure of an embodiment of the invention. Due to the coupling, the guided mode of the SOI waveguide and the gap plasmon-polariton mode are mixed forming the supermodes. Modal indices of the supermodes as a function of wavelength are calculated using the transform matrix method, and are shown in FIG. 3(a). More specifically, the supermode with higher modal index is labeled A, and the other one is labeled B.

Relying on the coupled mode theory, the losses for the TM-polarized mode in SOI waveguide are estimated as follows:

$$\alpha_{TM} = \frac{1}{2}\left(1 + \frac{\Delta\beta}{\sqrt{4\kappa^2 + \Delta\beta^2}}\right)\alpha_A + \frac{1}{2}\left(1 - \frac{\Delta\beta}{\sqrt{4\kappa^2 + \Delta\beta^2}}\right)\alpha_B \quad \text{EQUATION (4)}$$

where $\Delta\beta$ is the detuning from the exact resonance, and $\kappa$ is the coupling constant. Both detuning and coupling constant are found from data presented in FIG. 3(a). In Equation (4), $\alpha_A$ and $\alpha_B$ are losses of corresponding supermodes (FIG. 3(b)).

Figure 4:
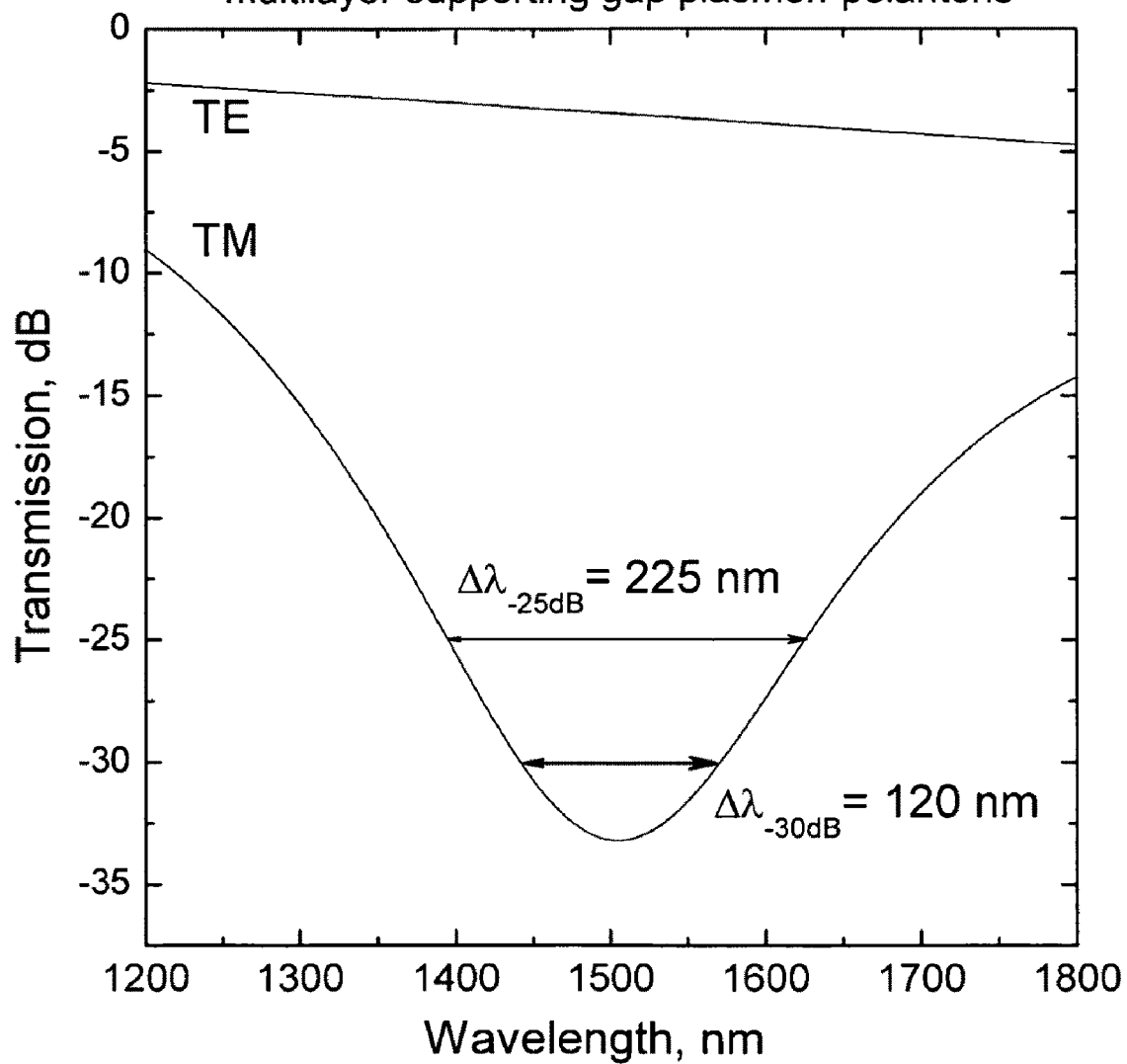
FIG. 4 is a graphical representation of transmission through L=80 µm long section of the SOI waveguide loaded with the metal-dielectric nanoscale multilayer supporting gap plasm on-polaritons.

FIG. 4 is a graphical representation of transmission through L=80 μm long section of the SOI waveguide loaded with the metal-dielectric nanoscale multilayer supporting gap plasm on-polaritons. With the loaded section L=80 μm long, attenuation as large as 30 dB is found the 120 nm wide range from 1450 nm to 1570 nm. At the 25 dB level attenuation, the range is about 225 nm wide stretching from 1400 nm to 1625 nm. At the same time, attenuation for the TE-polarized mode is between 3 dB and 4 dB across the wavelength range of interest. The attenuation as a function of wavelength is shown in FIG. 4.

FIGS. 5(a), 5(b), 6(a) and 6(b) are graphical representations that further summarize the modal indices of metal-dielectric composites with 25 nm layers and dielectric claddings, realized in the present embodiment of the invention. While optical losses of the bulk plasmon polariton modes in multilayers are larger than losses of SPPs these modes are of significant interest to nanophotonics due to extremely strong field confinement. Besides light guiding by sub-wavelength structures, nanoscale multilayers with appropriately patterned films are promising candidates for development of metamaterials with negative refractive index, as well as for development of nano-sensors.

The traditional classification scheme for transverse electromagnetic modes in multilayers relies on the number of nodes in the field distributions. Accordingly, the SPP supported by a single interface is a $TM_0$ mode. The LRP and SRP supported by a thin metal film are labeled as $TM_0$ and $TM_1$ modes. The gap plasmon polariton is a $TM_0$ mode. This mode labeling scheme is suitable for the dielectric waveguides, but may be confusing when applied to nanoscale metal-dielectric structures. It is inconvenient that the same designation $TM_0$ is applied to different electromagnetic excitations such as surface plasmon polaritons, long-range film plasmon polaritons, and the gap plasmon polaritons. Two modes of a metal strip with $|\epsilon_m|<\epsilon_d$ are both $TM_0$ waves. A further inconvenience is that essentially the same mode—the gap plasmon polariton—is labeled $TM_0$ in the structure with metallic claddings, and it becomes a $TM_2$ mode in a structure with dielectric claddings, two thin metallic layers, and the guiding dielectric layer. The $TM_n$ label indicates the number of nodes in the modal field distribution. This number, however, is not associated directly with the character of a particular mode guided by a nanoscale multilayer (smooth, oscillating, confined to the bulk of the multilayer, surface wave etc.).

Once the highly confined bulk modes and the film-plasmon-polariton-type modes have distinct properties, it is reasonable to label them differently. In particular, in a structure with large number of layers, the bulk mode with relatively smooth profile is reasonable to call the fundamental bulk plasmon polariton mode $BPP_0$. In the traditional numbering scheme this is a $TM_2$ mode because it has two nodes close to the interfaces with the claddings. Accordingly, the bulk mode of order n ($BPP_n$) would be labeled as $TM_{n+2}$ in the traditional classification. The labels such as LRP and SRP should be reserved for the modes with intensity maxima at the interfaces with the claddings. When claddings have different permittivities, the labels LRP and SRP become rather senseless. Instead, titles such as SPP bounded to particular interfaces will be more appropriate.

It is noted that in a finite thickness nano-layered film the bulk modes, due to minor penetration into the claddings, are rather independent of the cladding indices. Therefore, all $BPP_n$ mode labeling is also independent of the claddings—a significant advantage over traditional scheme, which is strongly affected by the indices of the claddings.

Figure 5:
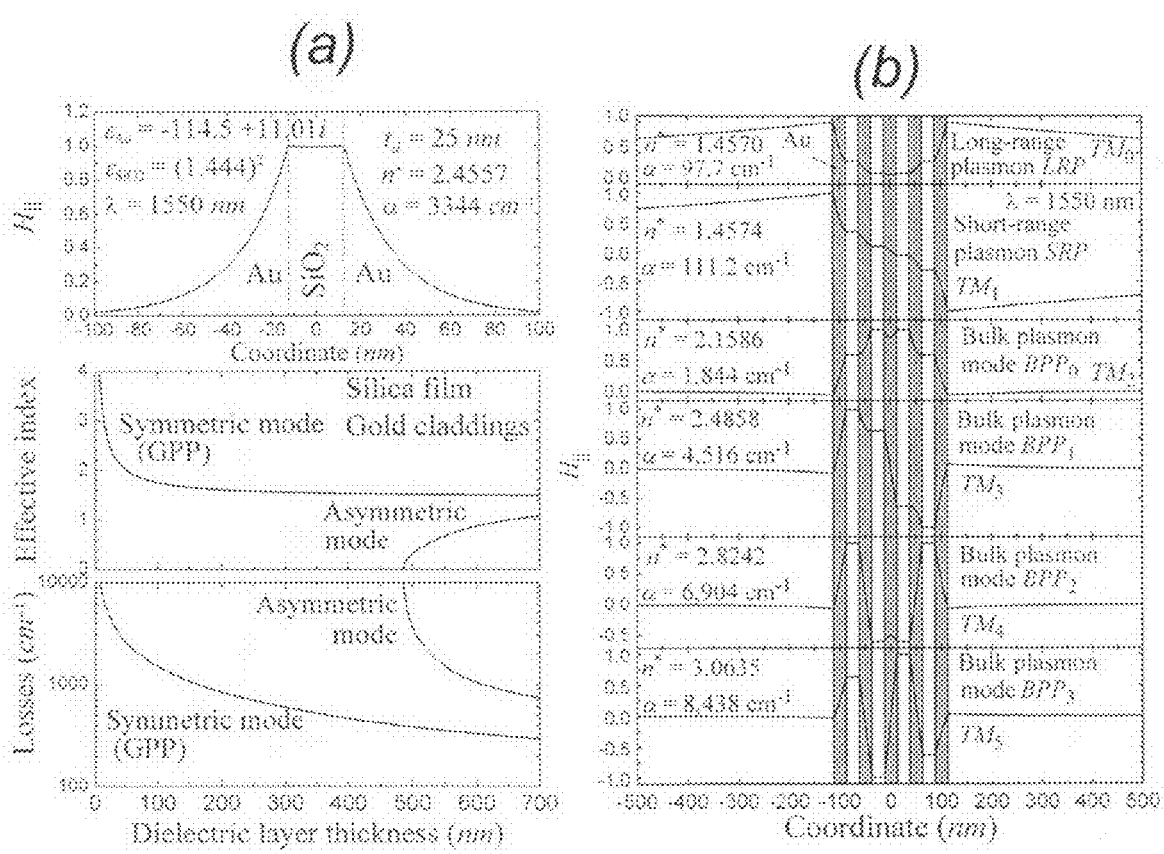
FIGS. 5(*a*) and 5(*b*) are graphical representations that summarize the modal indices of metal-dielectric composites with 25 nm layers and dielectric claddings, realized in the present embodiment of the invention.

The proposed scheme is illustrated in FIG. 5(b) on the example of modes of a composite with $N_d=4$ dielectric and $N_m=5$ metallic 25 nm thick layers. The structure supports the long-range plasmon polariton (LRP=$TM_0$), the short-range plasmon polariton (SRP=$TM_1$), and four bulk plasmon polariton modes ($BPP_0 \ldots BPP_3=TM_2 \ldots TM_5$). Both LRP and SRP show large penetration into the claddings. In contrast, the bulk plasmon polariton modes are confined within the multilayer with minor fraction of optical power propagating in the claddings. The fundamental bulk mode $BPP_0$ has rather smooth field profile. For the highest order bulk mode, the modal field reveals fast oscillations so that it has opposite signs in neighboring dielectric layers. Note that the modal indices of the BPP modes can be several times higher than the refractive index of the dielectric in the multilayer. The origin of this surprising behavior is in the coupling-induced repulsion of the modal indices of individual gap plasmon polaritons discussed above.

The modal indices of guided modes in a multilayer with alternating 25 nm thick layers of gold and silica are shown in FIGS. 6(a) and 6(b). As predicted, the number of bulk modes is equal to the number of dielectric layers, and the maximal modal index increases with the number of layers increasing. For any given number of layers, modes of higher order have larger losses and larger modal indices. Assuming the number of layers is approaching infinity $N \rightarrow \infty$, the dispersion relation for the highest and the lowest order bulk plasmon polariton modes ($BPP_N$ and $BPP_0$) by setting periodical boundary conditions and requiring that the magnetic field strength has a node in the middle of every metal layer ($BPP_N$) or does not have such a node ($BPP_0$):

$$\tanh\left(\frac{\pi t_m}{\lambda}\sqrt{n_{BPP_N}^{*2}-\varepsilon_m}\right)\tanh\left(\frac{\pi t_d}{\lambda}\sqrt{n_{BPP_N}^{*2}-\varepsilon_d}\right)+ \quad \text{EQUATION 5(A)}$$

$$\frac{\varepsilon_d}{\varepsilon_m}\sqrt{\frac{n_{BPP_N}^{*2}-\varepsilon_m}{n_{BPP_N}^{*2}-\varepsilon_d}}=0$$

$$\tanh\left(\frac{\pi t_d}{\lambda}\sqrt{n_{BPP_0}^{*2}-\varepsilon_d}\right)\Big/\tanh\left(\frac{\pi t_m}{\lambda}\sqrt{n_{BPP_0}^{*2}-\varepsilon_m}\right)+ \quad \text{EQUATION 5(B)}$$

$$\frac{\varepsilon_d}{\varepsilon_m}\sqrt{\frac{n_{BPP_0}^{*2}-\varepsilon_m}{n_{BPP_0}^{*2}-\varepsilon_d}}=0$$

Equations 5(a) and 5(b) do not contain the cladding indices or the overall composite thickness, further indicating "bulk" origin of these modes. In the limit of thin (nanoscale) layers, these equations yield the following approximation for the modal indices:

$$n_{BPP_N}^{*} \approx \sqrt{\varepsilon_d - \frac{\lambda^2}{\pi^2 t_d t_m}\frac{\varepsilon_d}{\varepsilon_m}} \quad \text{EQUATION 6}$$

$$n_{BPP_0}^{*} \approx \sqrt{\frac{\varepsilon_d \varepsilon_m (t_d + t_m)}{t_d \varepsilon_m + t_m \varepsilon_d}}$$

It is to be noted that the wavelength disappears from the expression for the modal index of the fundamental mode and the equation becomes equivalent to the predictions of the effective medium theory. The highest order mode has larger modal index than a single gap plasmon polariton provided that:

$$t_{d,m} \ll \lambda/\pi\sqrt{|\varepsilon_m|}$$

Figure 6:
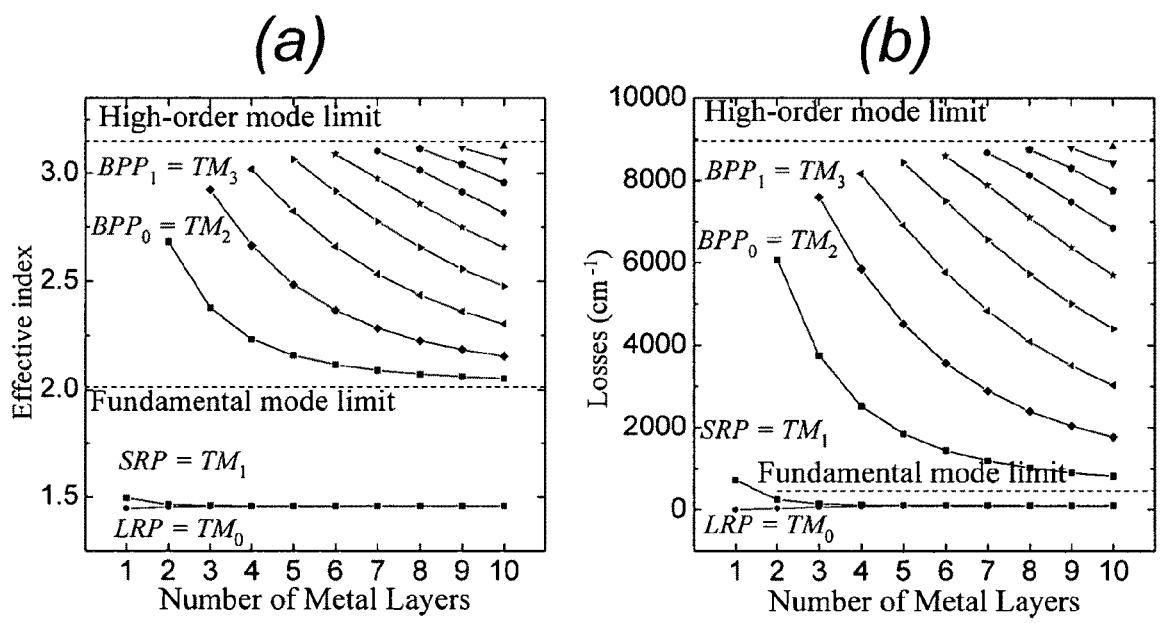
FIGS. 6(*a*) and 6(*b*) are graphical representations that correlate the effective index and the losses, respectively, versus the number of metal layers in the context of the high-order mode limit.

For the gold-silica multilayers with $t_d=t_m=25$ nm, Equations 5(a) and 5(b) give $Re(n^*_{BPPN})=3.1488$ and $\alpha=(4\pi/\lambda)Im(n^*_{BPPR})=8,959$ cm$^{-1}$—maximal possible values for the modal index and losses for the high-order bulk mode $BPP_N$. Corresponding values for the fundamental mode are $Re(n^*_{BPP0})=2.0128$ and $\alpha=(4\pi/\lambda)Im(n^*_{BPP0})=462.8$ cm$^{-1}$. These limits are shown in FIG. 6 by horizontal dashed lines.

The modes in a nanoscale metal-dielectric multilayer are relatively easy to predict and simulate numerically, but their experimental verification is challenging due to the deep sub-wavelength confinement and very high optical losses. To excite the high-index modes, an evanescent light coupling scheme is employed. High-index material (silicon, $n_{Si}=3.48$) is used to match the wavevector of light in free space to the wavevector of a guided mode.

In order to access a wider range of modal indices, semi-cylinder geometry instead of more traditional prism was used. In a similar manner, a high-index semi-spherical solid immersion lens can be used, but for accurate angular measurement the semi-cylindrical geometry is preferable. Light from a fiber-coupled tunable (1490-1590 nm) semiconductor laser (Photonetics Inc.) is collimated using a 10' objective. The laser is tuned to the wavelength of 1550 nm, which is verified by an optical spectrum analyzer (Hewlett-Packard HP70951B). The spectral width of the laser radiation was below the resolution of the spectrometer (<0.1 nm). Angular reflection spectrum is measured, and the datum plotted as a function of the product $n_{Si} \times Sin(\theta)$, where $\theta$ is the incident angle. In this scale, the intensity minima directly indicate the modal indices of the guided modes excited through the evanescent coupling.

The multilayer structure of the specific illustrative embodiment of the invention was designed to consist of three pairs of silica(~25 nm)/gold(~25 nm). The layers were deposited directly on the flat facet of the semi-cylinder. The gold layers were deposited by electron beam evaporation, and silica layers—by plasma-enhanced chemical vapor deposition. With two dielectric gaps between three metal layers, the structure supports two BPP modes. The thickness of the layers was chosen to ensure that the effective indices of the bulk modes are in the comfortable for the measurement range (n*<3.0).

The first silica layer between silicon and gold is not crucial. Its role is to adjust the evanescent coupling strength for clear observation of guided modes. They verify guided modes with modal indices 2.31 and 2.88 recognized as $BPP_0$ and $BPP_1$. The structure of this embodiment was designed for measuring the modal indices of the bulk modes, while the SPP at the interface with the substrate is over-damped, and the SPP at the interface with air has vanishing small evanescent coupling with the incident beam. By fitting the experimental data with numerically simulated angular reflection, the best fit structure has been identified as Si/33 nm-silica/24 nm-gold/24 nm-silica/26 nm-gold/31 nm-silica/24 nm-gold (in average, 29 nm-silica/25 nm-gold), which is close to the deposition target numbers.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A silicon-on-insulator device comprising:
 a waveguide having a carrier wafer layer, a buffer layer, a guiding layer, and a cladding layer; and
 a polarizing arrangement formed by a deposition process on a predetermined portion of said waveguide, said polarizing arrangement having a bottom metal layer, a dielectric gap, and a top metal layer, the bottom metal layer being deposited on the cladding layer.

2. The silicon-on-insulator device of claim 1, wherein there is further provided a protection layer deposited to overlie the top metal layer.

3. The silicon-on-insulator device of claim 2, wherein said protection layer is formed of $SiO_2$.

4. The silicon-on-insulator device of claim 1, wherein said waveguide is a silicon-on-insulator waveguide that propagates electromagnetic energy in TE and TM transmission modes, and said polarizing arrangement is configured to attenuate preferentially the TM transmission mode.

5. The silicon-on-insulator device of claim 4, wherein there is formed a gap plasmon-polariton (GPP) confined to the dielectric gap.

6. The silicon-on-insulator device of claim 5, wherein the dielectric gap has a high optical loss characteristic.

7. The silicon-on-insulator device of claim 1, wherein the guiding layer and the dielectric gap are spaced from one another so as to allow electromagnetic energy propagating along the guiding layer in the TM transmission mode to transfer to the dielectric gap.

8. The silicon-on-insulator device of claim 7 wherein the transfer of electromagnetic energy from the guiding layer to the dielectric gap is effected by tunneling coupling.

9. The silicon-on-insulator device of claim 1, wherein the dielectric gap is formed of $SiO_2$.

10. The silicon-on-insulator device of claim 1, wherein the top and bottom metal layers are formed of Au.

11. The silicon-on-insulator device of claim 1, wherein the polarizing arrangement has a magnetic field strength characteristic that tapers discontinuously at the interface between the dielectric gap and the top and bottom metal layers.

12. A method of forming a silicon-on-insulator device, the method comprising the steps of:

forming a silicon-on-insulator waveguide arrangement for propagating electromagnetic energy in a plurality of transmission modes; and forming by a deposition process on the silicon-on-insulator waveguide arrangement a polarizer structure that preferentially absorbs the electromagnetic energy being propagated along the silicon-on-insulator waveguide arrangement in a predetermined transmission mode, said step of forming by a deposition process including the steps of:

depositing a bottom metal layer;

depositing a dielectric gap layer to overlie the bottom layer; and depositing a top metal layer to overlie the dielectric gap layer.

13. The method of claim 12, wherein there is further provided the step of depositing a protection layer to overlie the top metal layer.

14. The method of claim 12, wherein the plurality of transmission modes comprises TE and TM transmission modes, and the polarizer structure preferentially absorbs the electromagnetic energy being propagated along the silicon-on-insulator waveguide arrangement in the TM transmission mode.

15. The method of claim 12, wherein said step of forming by a deposition process comprises the further step of employing chemical vapor deposition.

16. The method of claim 12, wherein said step of forming by a deposition process comprises the further step of employing thermal evaporation.

* * * * *